(No Model.) 3 Sheets—Sheet 1.
A. A. WILLSON.
COMBINED CENTRIFUGAL AND SCREW PUMP.
No. 398,301. Patented Feb. 19, 1889.
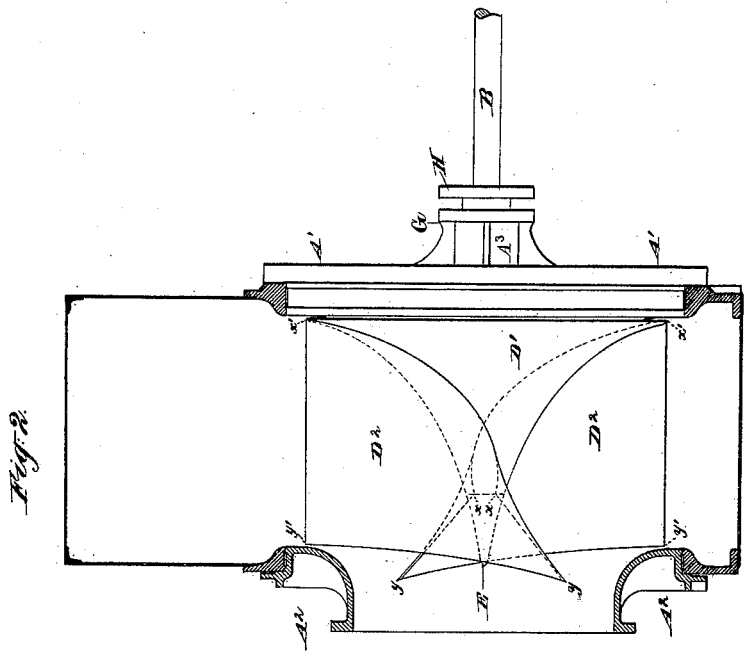
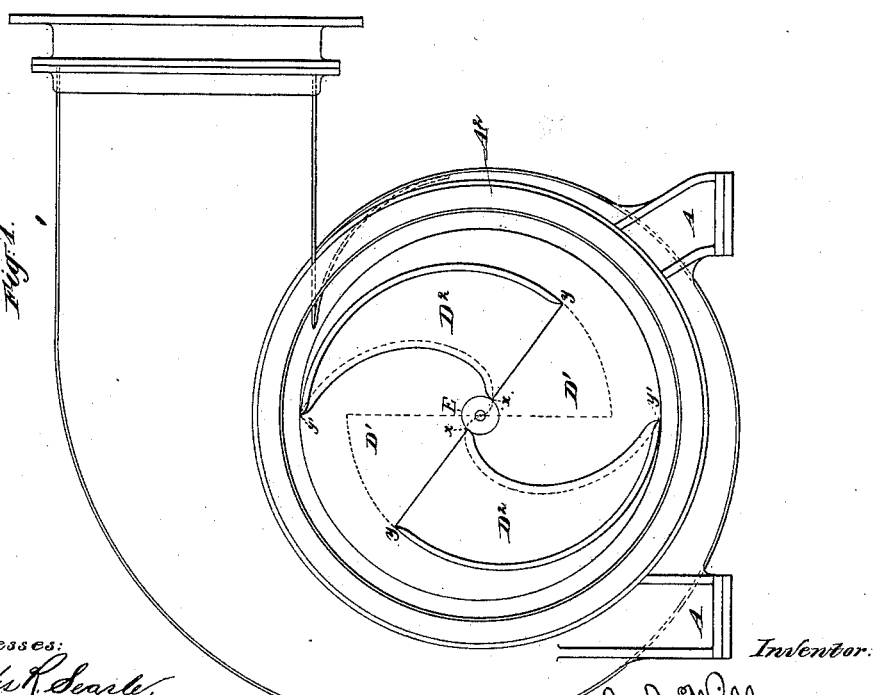
Witnesses:
Charles R. Searle,
Florence Richmond
Inventor:
A. A. Willson
by his attorney
Thomas Drew Stetson (No Model.) 3 Sheets—Sheet 2.
A. A. WILLSON.
COMBINED CENTRIFUGAL AND SCREW PUMP.
No. 398,301. Patented Feb. 19, 1889.
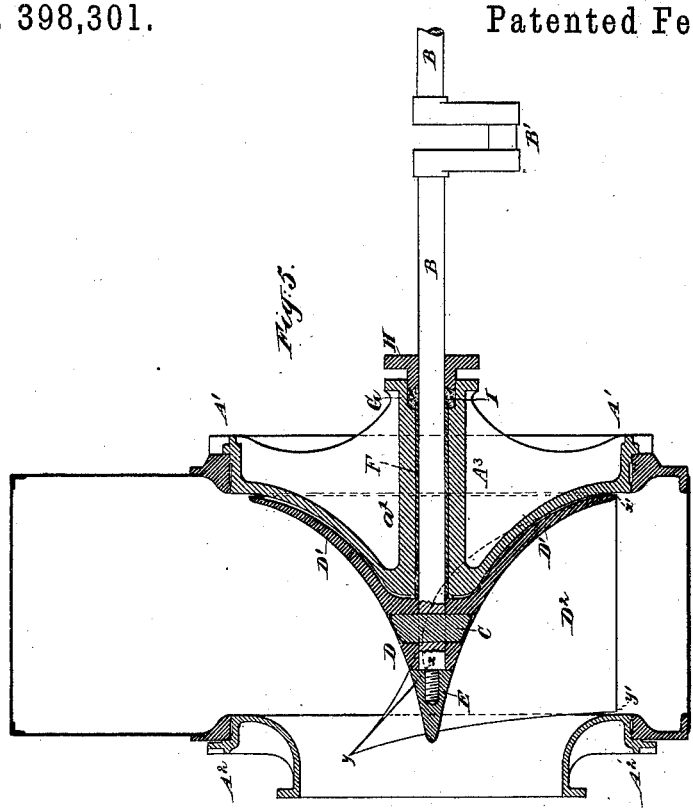
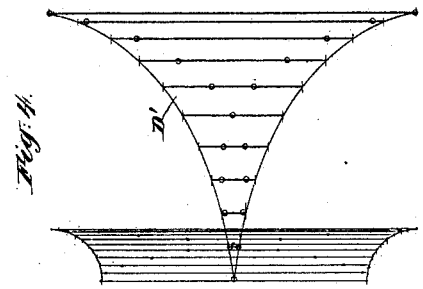
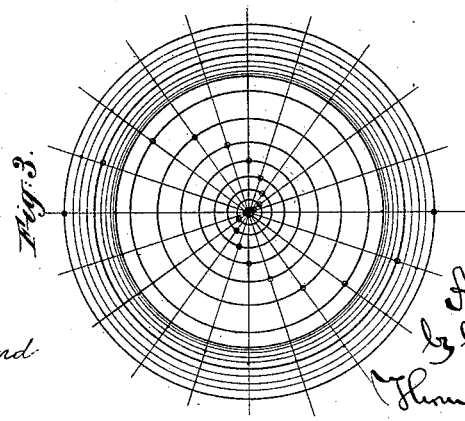
Witnesses:
Charles R. Searle
Florence Richmond
Inventor:
A. A. Willson
by his attorney
Thomas Drew Stetson

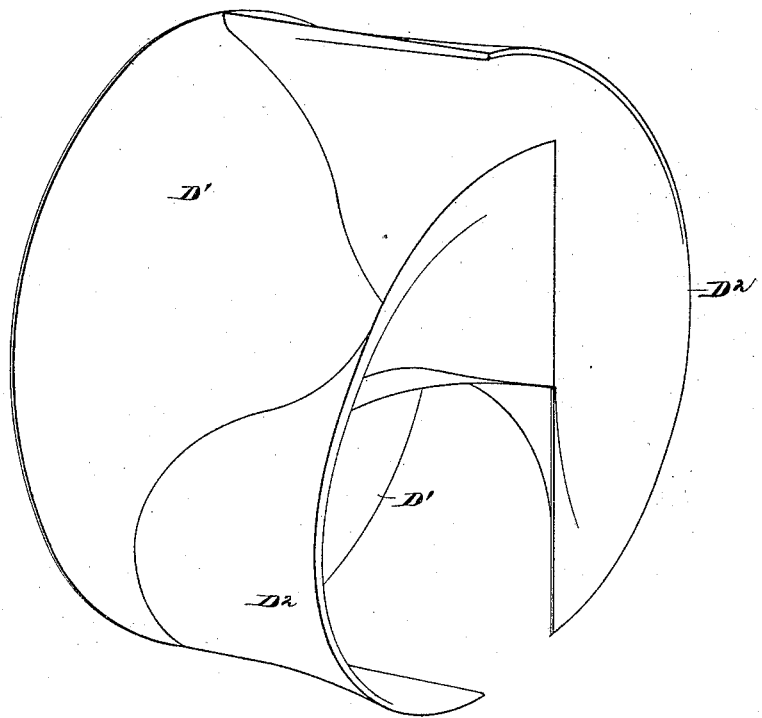

UNITED STATES PATENT OFFICE.

ALBERT A. WILLSON, OF BROOKLYN, NEW YORK.

COMBINED CENTRIFUGAL AND SCREW PUMP.

SPECIFICATION forming part of Letters Patent No. 398,301, dated February 19, 1889.

Application filed June 21, 1886. Serial No. 205,776. (No model.)

*To all whom it may concern:*

Be it known that I, ALBERT A. WILLSON, of Brooklyn, in the county of Kings and State of New York, have invented a certain new and useful Improvement in a Combined Centrifugal and Screw Pump, of which the following is a specification.

A British patent to C. A. Holm in 1853, No. 2,290, sets forth a form of blade the main body of which is curved backward in the style sometimes known as "Appold," with a screw at the edge, which receives the water. The patent states that there is an intermediate portion in which a change is smoothly made from the screw form at the receiving-edge to the fan form, which characterizes the main body. The water is received from one side only. The other side is a close wheel of conoidal form. I adopt this general plan, but I have made an important improvement. I make the blades to partake of the screw form throughout their entire area. The periphery may be made wider than usual for a given diameter of wheel. In what I esteem the best proportions, the wheel is but little larger than the induction-orifice. The form of the blades gives a smooth action, unusual efficiency for a given size of wheel, and great economy of power. There are other features of subordinate importance. I extend the stationary casing into the hollow interior of the conoidal wheel, and thereby obtain a bearing in a position which is central longitudinally as well as diametrically in the machine. A stuffing-box makes a water-tight joint at the bearing. I operate two pumps by one shaft, which extends across a dry pit between them.

The accompanying drawings form a part of this specification, and represent what I consider the best means of carrying out the invention.

Figure 1 is an end elevation from the receiving end, which I call the "front," with the nozzle removed. Fig. 2 is a vertical section through the casing, showing the revolving part in side elevation. Figs. 3 and 4 are outline diagrams aiding to illustrate the forms. Fig. 5 is a central longitudinal section. Fig. 6 is a perspective view showing the principle. It represents the conoidal wheel-body and the blades carried out farther than I deem expedient in general practice. The liability to contact with ice, floating timbers, &c., induces a curtailing of the conoid and of the receiving-edges of the blades in practice.

Similar letters of reference indicate corresponding parts in all the figures where they occur.

The shaft is marked B. One shaft, driven by engaging a steam-engine or a pair of such engines to a crank, B', formed in its midlength, operates two pumps which are counterparts each of the other, one being right hand and the other left hand, with a dry pit between them, in which the engine-connections work without obstruction. Any tendency of a wheel to be forced endwise, either toward or from the entering water, is balanced by the corresponding tendency of its mate to thrust or pull the shaft endwise in the opposite direction.

A description of one pump will suffice for both.

$A'$ $A^2$ are parts of a stationary casing of cast-iron or other suitable material. One side, $A'$, matching the hollow side of the wheel, is fitted with a stuffing-box affording a close joint around the shaft. The other side has an induction-nozzle, $A^2$, of large area in the center. This nozzle may, if desired, be connected to a suitable receiving-pipe of corresponding size. (Not shown.) The cross-section of the nozzle $A^2$ shows a trumpet shape with the large end presented inward, in which the water is allowed to spread as it is divided and urged outward by the wheel and its blades. (See Fig. 5.)

D is a stout central boss, and D' is a smooth conoidal wheel cast thereon. It forms, with a tapering nut, E, applied in front, a deflecting and spreading cone presented to the incoming and rapidly-whirled current of water.

The back side, $A'$, of the inclosing-casing is correspondingly conoidal and fits within the wheel. It is formed with a stationary boss, $A^3$, which constitutes a bearing within the hollow interior of D'. This arrangement supports the wheel centrally and steadily.

G is a stuffing-box having a gland, H, and means for pressing it against the packing I. This packs the joint around the shaft B and serves to preserve a dry pit, in which the means for driving the shaft may work.

F is a bushing of brass.

$D^2$ are the blades, cast in one with the wheel D'. There may be any desired number of blades. I have for greater clearness shown only two. They are alike, and a description of one will apply to all.

Having determined the conoidal form of the front face of the wheel D', I divide it angularly into twenty or some other number of equal parts and draw corresponding lines down the conoid from the apex to the periphery. Then I divide the whole length of these lines into ten equal parts. Finally, I draw upon the conoidal front surface of D', through the intersections of these lines, curved lines, which define the lines of junction therewith of the several blades. In each blade the edge which is presented toward the entering water I will term the "receiving-edge" or "entering-edge." It may be straight and radial; but, for convenience in practice, I cut away the central portion. Another edge is the above-described curved line by which the blade $D^2$ joins the wheel D'. I will term this the "back edge." The curve is a spiral enlarging from one end to the other. It may be termed a "spiral volute curve." Another edge is the delivery or outer edge. This is straight, and lies in a line parallel to the axis, like the corresponding edge of an ordinary fan-blade. It delivers the water by a plain fan-like action. The remaining edge is extremely spiral and runs close to the nozzle $A^2$. As the nozzle is curved in cross-section and this edge of the blade is spiral, the curve of this edge, although differing greatly from that of the back edge, may be also termed a "spiral volute." When the wheel is at rest, this edge of each blade may be conceived as traced on the inner surface of the nozzle $A^2$. The form of this extremely spiral front edge is determined as follows: Divide the circumference of $A^2$ into the same number of equal parts as the conoid D' was divided and draw corresponding longitudinal lines on the interior of $A^2$. Next divide these short lines into the same number of equal parts as the conoid D'. Next draw similarly through the points of intersection, and the extremely spiral edge of a blade is defined. I have assumed that the conoid was marked by twenty equidistant longitudinal lines, and that these were each divided into ten equal parts. Correspondingly there are twenty equidistant longitudinal lines and ten circles described on the interior of $A^2$. Care being taken to begin at the right point, the lines drawn through the intersections in $A^2$ will come always in the proper relations to the corresponding lines on the exterior of D'.

The surface of each blade may be considered as determined by a series of straight lines drawn from the above points of intersection in the interior of $A^2$ to the corresponding points of intersection on the wheel D'. A straight line from $x$ to $y$ will lie entirely in the surface at the receiving-edge of the blade. A straight line drawn from the third point of intersection on the extremely spiral edge of the blade to the corresponding third point of intersection on the back edge will lie exactly in the surface, and so on for all the lines between other corresponding points. The blade near the receiving-edge acts screwwise to seize the water. The blade gradually loses its screw form from this edge backward and outward. It is less and less screw-formed as the distance from the receiving-edge increases until at the extreme periphery it is parallel with the axis.

In practice I do not carry the central portions of the receiving-edges of the blades forward to the apex of the theoretical conoid D'. I suppress the conoid and a portion of each blade somewhat short of that point, but give a bluntly-pointed form to the conoid by aid of a conical nut, E.

The strong lines in Figs. 1, 2, and 5 show the invention thus utilized. The dotted lines in Fig. 1 and the strong lines in Fig. 6 show blades carried farther forward; but I recommend the curtailed form shown as usually preferable.

The pump acts without concussion or jar.

Modifications may be made without departing from the principle or sacrificing the advantages of the invention. The means of securing the hub D on the shaft B may be varied.

I claim as my invention—

1. In a centrifugal and screw pump, in combination with a suitable casing, the series of blades $D^2$, curved backward, as shown, and also screw-formed throughout, with the delivering-edge parallel to the axis and with the entering-edge at right angles to the axis, changing the form uniformly from the receiving-edge to the delivering-edge, as herein specified.

2. The casing A, with its bearing $A^3$ extended forward, in combination with a hollow conoidal wheel, D', having the series of blades $D^2$, curved backward, as shown, and also screw-formed throughout, with the delivering-edge parallel to the axis and with the entering-edge at right angles to the axis, changing the form uniformly from the receiving-edge to the delivering-edge, as herein specified.

In testimony whereof I have hereunto set my hand at New York city, New York, this 19th day of June, 1886, in the presence of two subscribing witnesses.

ALBERT A. WILLSON.

Witnesses:
F. A. RICHMOND,
M. F. BOYLE.